United States Patent
Watanabe

(10) Patent No.: US 7,698,521 B2
(45) Date of Patent: *Apr. 13, 2010

(54) DATA SYNCHRONIZATION OF MULTIPLE REMOTE STORAGE

(75) Inventor: Naoki Watanabe, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 364 days.

This patent is subject to a terminal disclaimer.

(21) Appl. No.: 11/810,463

(22) Filed: Jun. 5, 2007

(65) Prior Publication Data

US 2007/0239934 A1    Oct. 11, 2007

Related U.S. Application Data

(63) Continuation of application No. 10/832,839, filed on Apr. 26, 2004, now Pat. No. 7,234,033, which is a continuation of application No. 10/042,376, filed on Jan. 3, 2002, now Pat. No. 6,745,303.

(51) Int. Cl.
*G06F 12/00* (2006.01)
(52) U.S. Cl. ................ 711/162; 711/161; 711/E12.035
(58) Field of Classification Search ........................ None
See application file for complete search history.

(56) References Cited

U.S. PATENT DOCUMENTS

| | | | |
|---|---|---|---|
| 5,432,922 A | 7/1995 | Polyzois et al. | |
| 5,673,382 A | 9/1997 | Cannon et al. | |
| 5,742,792 A | 4/1998 | Yanai et al. | |
| 5,870,537 A | 2/1999 | Kern et al. | |
| 5,901,327 A | 5/1999 | Ofek | |
| 6,035,412 A | 3/2000 | Tamer et al. | |
| 6,044,444 A | 3/2000 | Ofek | |
| 6,052,797 A | 4/2000 | Ofek et al. | |
| 6,073,209 A | 6/2000 | Bergsten | |
| 6,088,740 A | 7/2000 | Ghaffari et al. | |
| 6,092,066 A | 7/2000 | Ofek | |
| 6,141,701 A | 10/2000 | Whitney | |
| 6,157,991 A | 12/2000 | Aron | |
| 6,173,377 B1 | 1/2001 | Yanai et al. | |
| 6,189,079 B1 | 2/2001 | Micka et al. | |
| 6,199,074 B1 | 3/2001 | Kern et al. | |
| 6,209,002 B1 | 3/2001 | Gagne et al. | |
| 6,247,099 B1 | 6/2001 | Skazinski et al. | |
| 6,260,124 B1 | 7/2001 | Crocket et al. | |
| 6,304,881 B1 | 10/2001 | Halim et al. | |
| 6,304,980 B1 | 10/2001 | Beardsley et al. | |
| 6,308,284 B1 | 10/2001 | LeCrone et al. | |
| 6,480,970 B1 | 11/2002 | DeKoning et al. | |
| 6,529,944 B1 | 3/2003 | LeCrone | |
| 6,571,278 B1 | 5/2003 | Negishi et al. | |

(Continued)

FOREIGN PATENT DOCUMENTS

JP    2000-020366 A    1/2000

*Primary Examiner*—Reginald G Bragdon
*Assistant Examiner*—Aracelis Ruiz
(74) *Attorney, Agent, or Firm*—Mattingly & Malur, P.C.

(57) ABSTRACT

A processing system includes a local or local storage and a number of remote or remote storage systems that store data mirroring that maintained by the local storage system. Data that is written, changed, deleted or other wise modified by the local storage system is periodically sent to the remote storage systems to update the mirroring data maintained by each.

8 Claims, 8 Drawing Sheets

U.S. PATENT DOCUMENTS

| | | |
|---|---|---|
| 6,643,671 B2 | 11/2003 | Milillo et al. |
| 6,643,795 B1 | 11/2003 | Sicola et al. |
| 6,665,780 B1 | 12/2003 | Bradley |
| 6,671,705 B1 | 12/2003 | Duprey et al. |
| 6,691,245 B1 | 2/2004 | DeKoning |
| 2002/0049776 A1 | 4/2002 | Aronoff et al. |
| 2002/0103943 A1 | 8/2002 | Lo et al. |
| 2003/0126388 A1 | 7/2003 | Yamagami |

SECONDARY FAIL

RE-SYNC

PRIMARY FAIL

SECONDARY (END) FAIL

SECONDARY (INTERMEDIATE) FAIL

NORMAL

NO DATA CONSISTENCY BETWEEN SECONDARY STORAGES

PRIMARY FAILED

RE-SYNCHRONIZE BY THE LATEST STORAGE

RE-SYNCHRONIZE BY MANAGER

DATA SYNCHRONIZATION OF MULTIPLE REMOTE STORAGE

CROSS-REFERENCES TO RELATED APPLICATIONS

This is a continuation application of U.S. application Ser. No. 10/832,839, filed Apr. 26, 2004, now U.S. Pat. No. 7,234,033, which is a continuation application of U.S. application Ser. No. 10/042,376, filed Jan. 3, 2002, now U.S. Pat. No. 6,745,303, both of which are incorporated herein by reference for all purposes.

BACKGROUND OF THE INVENTION

The present invention relates generally to data processing storage systems comprising a local or local storage facility and two or more remote storage facilities that mirror at least certain of the data retained by the local storage facility. More particularly, the invention relates to a method, and apparatus implementing that method, to synchronize the data at surviving storage facilities in the event of failure of one of them.

The use of data processing over the years by commercial, military, governmental and other endeavors has resulted in tremendous amounts of data being stored—much of it virtually priceless because of its importance. Businesses, for example, risk collapse should its data be lost. For this reason alone the local data is backed up to one or more copies of the data, and retained for use should the original data be corrupted or lost. The more important the data, the more elaborate the methods of backup. For example, one approach to protecting sensitive or valuable data is to store backup copies of that data at one or more sites that are geographically remote from the local storage facility. Each remote storage facility maintains a mirror image of the data held by the local storage facility, and changes (e.g., writes, deletions, etc.) to the local data image of the local storage facility are transferred and also effected at each of the remote storage facilities so that the mirroring of the local data image is maintained. An example of a remote storage system for mirroring data at a local storage system is shown by U.S. Pat. No. 5,933,653.

Updates sent to the remote storage facilities are often queued and sent as a group to keep the overhead of remote copying operations at a minimum. Also, the transmission medium often used it an Internet connections or similar. For these reasons, the data images mirroring the local data will, at times not be the same. If more than one remote storage is used to mirror the local data, there often will be times when the data images of the remote storages will be different from one another—at least until updated by the local storage facility. These interludes of different data images can be a problem if the local facility fails, leaving the remote storage facilities. Failure of the local storage facility can leave some remote storage facilities with data images that more closely if not exactly mirror that of the local storage facility before failure, while others have older "stale" data images that were never completely updated by the last update operation. Thus, failure of the local storage facility may require the remote storage facilities to re-synchronize the data between them in order that all have the same and latest data image before restarting the system. There are several approaches to data synchronization.

If a removable media (e.g., tape, CD-R, DVD, etc.) is used at the local and remote storage facilities, such removable media can be used. For example, a system administrator will copy data at the remote storage facility believed to have the most up-to-date data image of the local facility to the tape. Then, in order to keep the data image from changing before it is used to synchronize at the other remote storage facilities, input/output (I/O) operations at the image-donating facility are halted until the tape can be circulated to update the other remote storage facilities. At the remote storage, administrator copies data from removable media to storage at the remote site. Then, the system administrator re-configures the entire system to that one of the formally remote storage facilities is now the new local storage facility, and its I/O operations allowed be commence. This approach is efficient when the data involved is small, but not so for larger systems. Larger systems will produce data that grows rapidly, requiring what could be an inordinate amount of time to copy for the entire synchronization process.

Lacking removable media, another approach would be to use any network connections between the various storage facilities to communicate data. This approach requires that one storage facility be selected to replace the former local (but now failed) storage facility. I/O operations at the selected storage facility is halted, for the same reasons stated above, and a re-synchronize copy process is initiated between the selected storage facility and the other remote storage facilities. When the re-synchronization process is complete, I/O operations are restarted at the selected storage facility, and the system proceeds as before, albeit with one less storage facility (the failed former local storage facility).

A major problem with this latter approach it the time needed for the re-synchronization process, particularly for larger amounts of data. For example, a storage of 100 terabytes (TB) of data, using 100 MB/s network transfer connection, will take approximately 11.57 days all the data. $(100 \times 10^{12}/(100 \times 10^6) = 10^6$ sec=277 hour=11.57 Days). This is the time for re-synchronization of just one storage facility. If re-synchronize is to be performed for more than one storage facility, the problem is exacerbated. Also, during the re-synchronization process, I/O operations of the storage facilities involved are halted.

BRIEF SUMMARY OF THE INVENTION

The present invention provides a method, and architecture for implementing that method, of synchronizing two or more remote or remote data storage facilities so that they hold and maintain the same data images in the event of a failure of the local storage.

Broadly, the invention pertains to a data processing system comprising a local (local) data storage facility communicatively coupled to two or more remote or remote storage facilities Each of remote storage facilities, whether local or remote, include storage media data storage. Data maintained on the storage media at the local data storage facility is mirrored on storage media at the remote storage facilities. Changes to the data image of the local storage facility are periodically sent to the remote storage facilities for updating their date images. Each of the storage facilities keeps information that is indicative of the history of what updates received have been received by the remote storage facilities and what updates have been received and implemented (by writes to the storage medial of such remote storage facility). In the event of failure of a storage facility, the surviving storage facilities circulate the historical update to determine any differences, if any, of the data images, i.e., have there been updates not received by any of the surviving storage facilities. If so, the surviving storage facilities will synchronize their data images so that all have a substantially identical data image.

Advantages of the invention include the fact that in data processing systems having storages that are mirrored, the mirrored images of the local storage will correspond to one another in the event of a failure of the local storage they mirror.

These and other features and advantages of the present invention may be obtained from a reading of the following detailed description, which should be taken in conjunction with the accompanying drawings.

DETAILED DESCRIPTION OF THE INVENTION

Figure 1:
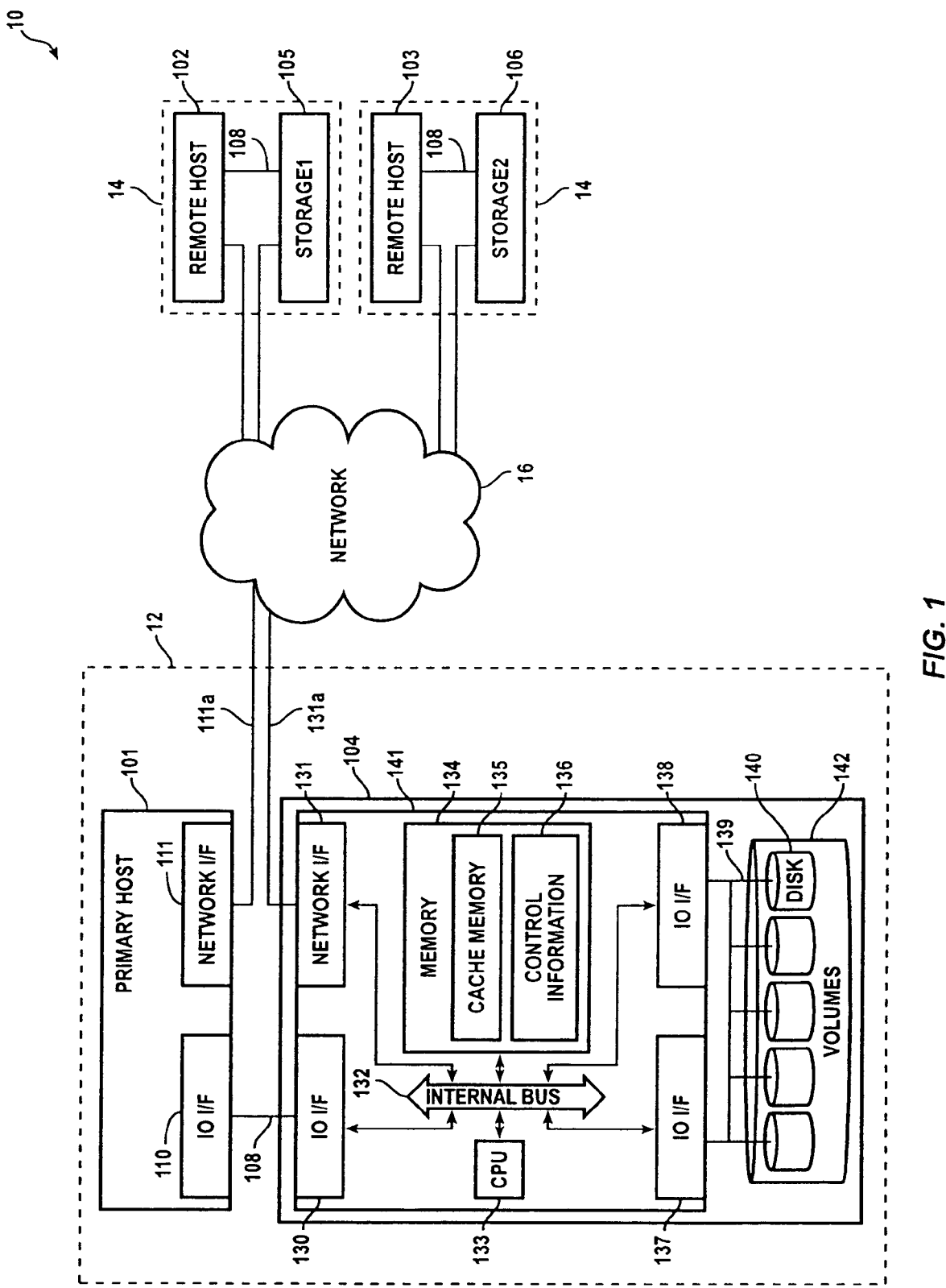
FIG. 1 is a block diagram illustration, broadly showing a data processing system, including a local, a multiple remote, storage facilities, constructed to implement the present invention.

Turning now to FIG. 1, there is illustrated a data processing system, designated generally with the reference numeral 10, including a local or local site 12 and a number of remote sites 14 communicatively interconnected by a data communicating network 16. The local site 12 is shown as including a host processor 101 and a local storage facility 104. The host 101 and storage facility 104 are coupled to the remote sites 14 by the network 16 for communicating updates made to the data image kept by the local site 12 to the remote sites 14. Thereby, the remote sites 14 will maintain data images that mirror that of the local site 12.

The remote sites 14 are shown as each including remote storage facilities 105, 106, and each site 14 may or may not have corresponding host processors 102, 103. The remote storage facilities 105, 106 will include storage media much like that of the local storage facility (discussed further below) to keep the data images that will mirror that of the remote storage facility 104. Although the remote sites provide access to needed data in the event of planned or unplanned outages of the local storage facility 104, it may be more beneficial to locate the remote sites 14 are geographically removed from the local storage facility 104 in order to protect the sites and the data they maintain should the local site 12 encounter a catastrophic and/or disastrous event that destroys the data.

The remote storage facilities 105, 106 are substantially identical to the local storage facility 104 so that a discussion of the local storage facility will apply equally to the remote storage facilities 105, 106.

At the local site 12, the host processor 101 connects to the network 16 through a network interface (I/F) 111 and network connection 111a, and to the local storage facility 104 through an input/output (I/O) bus 108 and I/O interface 110.

The local storage facility 104 includes a disk controller 141 having an I/O interface 130 to receive the I/O bus 108, and a network interface 131 and network connection 131a to connect to the data communicating network 16. The local storage facility 104 also includes storage media 142, here implemented by disk units 140, to which the disk controller 141 connects by a data path 131 through an I/O interface elements 137, 138.

The disk controller 141 itself has a central processing unit (CPU) 133 coupled to a memory 134 via an internal bus 132, which also connects to the various interfaces (e.g., I/O IF 130, 138, network I/F 131, etc.) of the disk controller. The memory 134 will include cache memory 135 to caches reads and writes involving the storage media 142 in response to I/O requests from the host 101. The memory may also be used for maintaining certain data structures and information such as control information 136.

The CPU 133 will preferably execute a remote copy process that, in conventional fashion, operates to send any changes to the data image on the storage media 142 (as established, for example, by the host processor 101) to the remote storage facilities (which maintain their own storage media) 105, 106. Thereby, the remote storage facilities 105, 106 will mirror the data maintained by the local storage facility 104. Briefly, a remote copy process operates as follows: When the disk controller 104 receives an I/O write request which either adds to, changes, deletes, or otherwise modifies the data (data image) kept on the storage media 142, it will write that data to the storage media. Each such write to the storage media, or at least a portion at which the data image mirrored at the remote sites 14 is concerned, will cause a data message to be created and placed on a remote copy queue (not shown). The remote copy queue is periodically reviewed by the remote copy process running on the CPU 133. When the queue is found to contain one or more data messages, the messages are retried and sent to each of the remote storage facilities 105, 106, which in turn will write the data of the data message, thereby updating their data images to that of the local site 12.

Figure 2:
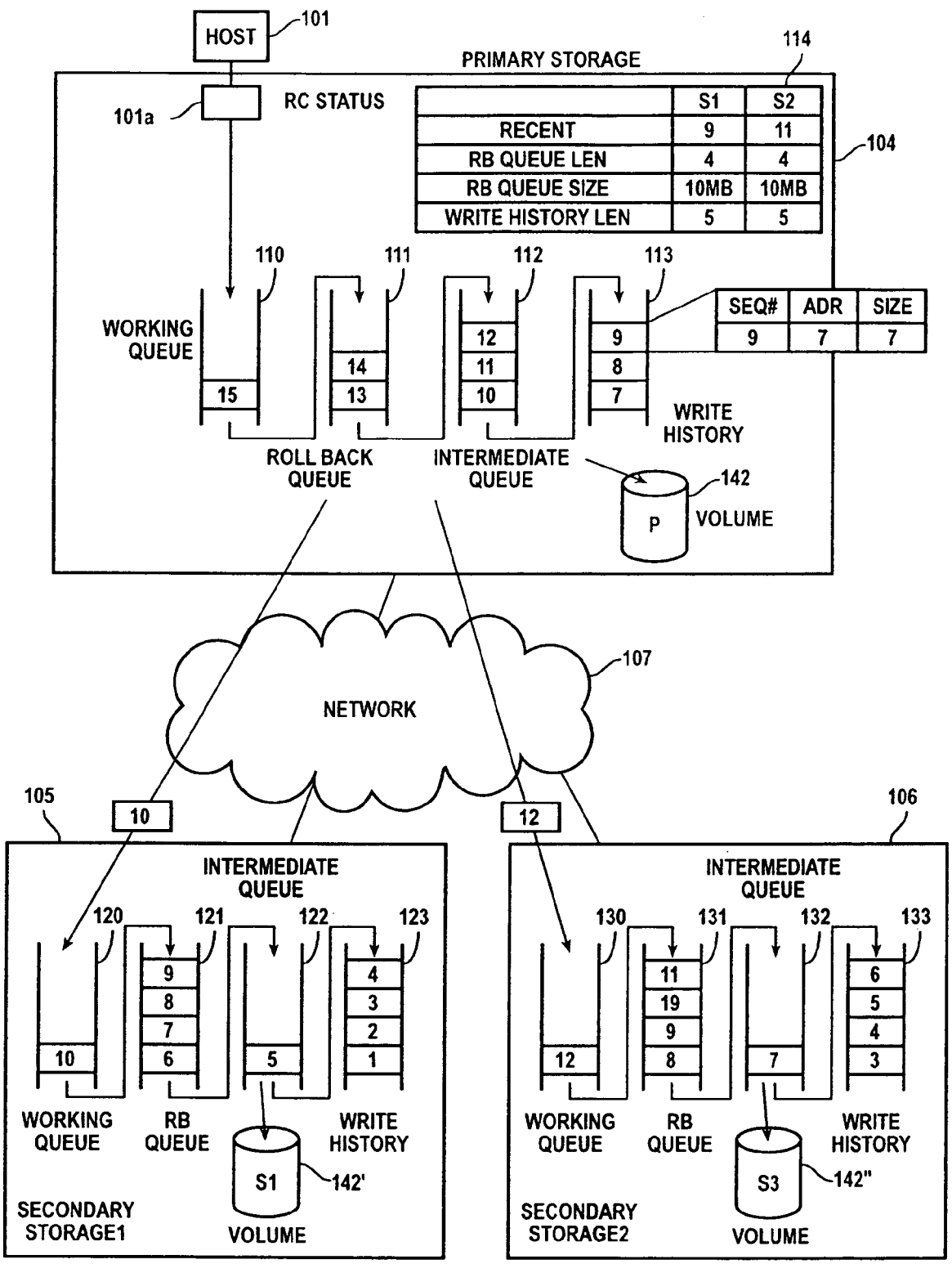
FIG. 2 is a diagram that illustrates the queue structures implemented in each of the local and remote storage facilities for keeping historical information data updates sent by the local storage and to the remote storage facilities.

Information about data message is kept by the storage facilities 104, 105, 106 as historical information, describing data messages sent, or in the process of being sent, by the local storage facility 104, or received by the remote storage facilities. Each storage facility implements the historical information with a plurality of queue structures. FIG. 2 illustrates these queue structures. As FIG. 2 shows, the disk controller 104 includes queues a working queue 110, a rollback queue 111, an intermediate queue 112, and a write history queue 113. The working, rollback, intermediate, and write history queues 110-113 are mirrored at the remote storage facilities 105 (queues 120, 121, 122, and 123, respectively) and 106 (queues 130, 131, 132, and 133, respectively). The queues are implemented in a first-in-first-out (FIFO) structure.

I/O read and write requests typically include command entry and accompanying or following data (if a write request). The command entry identifies the data, the location at the storage media 142 at which it is to be written (for write requests) or from which is to be read (for read requests), and such other information as may be needed according to the implementation. When an I/O request is received from the host processor 101 to write data that changes the data image mirrored by the remote storage systems 105, 106, the command entry will be assigned a sequence number. A command entry is then formed, comprising the command entry and assigned sequence number. The command entry is then inserted in the working queue 110. This forms the historical information for that data and the data message that will be sent forwarding the data to the remote storage facilities.

While the command entry is in the working queue, the corresponding write request is being processed. This includes receiving the data corresponding of the write request (which is either with the request, or follows the request, depending upon the communication protocol used by the host 101 and storage system 104), assigning assigned an area of the cache 135 for the data, and writing the data to that area when received. A pointer to the cached data is then associated with the corresponding command entry. A status message is returned to the sender of the I/O request, indicating the status of the data of the I/O request, i.e., whether received or an error in receiving had been detected.

FIG. 2 shows an I/O write request 101A being received by the disk controller 104, assigned a sequence number ("15"), and a command entry formed with the assigned sequence number and the command entry of the write request. The command entry is then placed in the working queue 110 for further processing as described above.

When the I/O request is processed, and no error was encountered, the command entry is moved from the working queue 110 to the rollback queue 111. The rollback queue a temporary holding area, and is used for a rollback synchronization process by the local storage facility 104 and the remote storage facilities 105, 106, as will be described more fully below. The remote storage facilities 105, 106 have the same queue structures, including a rollback queue, for basically the same purposes. Suffice it to say here that data corresponding to the command entries contained in the rollback queue are subject to being use in the synchronization process of the present invention, which may include being discarded should a failure of one of the storage facilities be detected, or alternatively circulated among the surviving storage facilities.

From the rollback back queue 111 command entries are moved to the intermediate queue 112, which holds the entries while the associated data is awaiting or being written to the storage media 142. And, when written, the command entry is then used to form a remote copy request for forming a data message that will be sent to the remote storages to update the data images they maintain, mirroring that of the primary storage facility 104. Then, the pointer is stripped from the command entry, and the entry is placed on a write history queue 113.

FIG. 2 shows, as indicated above, the command entry from an I/O request assigned a sequence number 15 is being received from the host processor 101 and, therefore, placed on the working queue 110. Command entry with the sequence numbers 13 and 14 are presently held in the roll back queue 111, awaiting the writing of the associated data to the storage media 142. The intermediate queue 112 is shown holding command entry with assign sequence numbers 10, 11, and 12. The command entry with sequence number 10 is either next up to be written or in the process of being written. Command entry with sequence numbers 7, 8, and 9 have had their associated data written to the storage media 142, and therefore have been placed on the write history queue 113.

The remote storage facilities maintain substantially the same queue structures, and operating in the same manner. Thus, for example, the remote storage 105 is shown as receiving a data message having command entry assigned the sequence number 10, which is placed on the working queue while the full data package is being received. The sequence number 10 is that assigned by the local storage facility 104. Once the data message is received, its command entry is moved from the working queue to the rollback queue 121, which FIG. 2 shows presently holding command entry for data messages with the sequence numbers 6-9. The intermediate queue has a command entry for a data message that was assigned sequence number 5, which is being written to the storage media 142' of the storage facility 105. When written, the entry will be moved to the write history queue 123, along with the command entry for the data messages of sequence numbers 1-4. Depending upon the depth of the write history queue 123, an earliest entry, for example the entry for the sequence number 1, may be expelled when command entry with the sequence number 5 is placed thereon.

The other remote storage 106 has the same data queues (130, 131, . . . , 133). FIG. 2 shows the remote storage 106 as presently receiving a data message related to the sequence number 12, the command entry of which is placed on the working queue 130. Roll back queue 131 presently contains control information with sequence numbers 8-11, and so on.

Although it is preferred that the queues used to track the historical information by the storage facilities are maintained in memory, those skilled in this art will recognize that they may also be kept on the storage media.

The local storage facility 104 also maintains in memory 134 (FIG. 1) a remote copy status table 114, identifying by sequence number, which data messages have been sent, which have been received and acknowledged by which remote storage facility. For example, the last data message received by the remote storage facility 105 (identified as "S1" in table 114) was that with the sequence number 9, while remote storage 106 (S2) received the data message with sequence number 11. The copy status table 114 also keeps information respecting the rollback and write history queues of the remote storage facilities. Thus, as the table 114 shows, the rollback queues of the remote storage facilities 105, 106 each have a "length" of 4 data message entries, and are capable of holding up to 10 megabytes of data. The write history queues for each of the remote storage facilities 105, 106 has five entries for five data messages. A write history size in terms of bytes may also be kept in the table 114.

FIG. 3 is an illustration of the different failure mode scenarios that can take place for data processing systems with different network architectures. Referring first to FIG. 3A, illustrated is a data processing system comprising a local storage facility 304A communicatively coupled to remote storage facilities 305A and 306A in a parallel. If, as FIG. 3A shows, the remote storage facility 105A fails, there is no need for a data synchronization process, because the local storage facility 304A is still available to update the surviving remote storage facility 306A by normal remote copy operations.

Figure 3A:
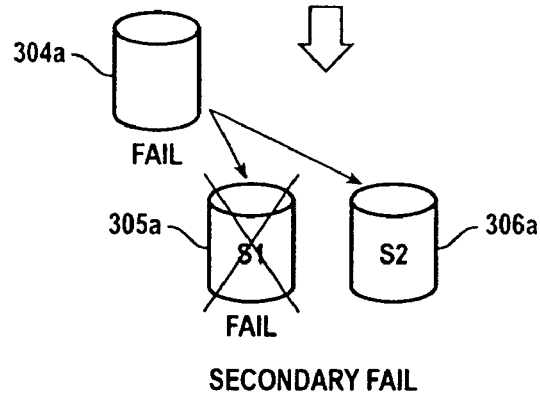
FIGS. 3A-3E are diagrammatic illustrations of the different failure modes that can take place, depending upon the particular architectures used to interconnect local and remote storage facilities.
Figure 3B:
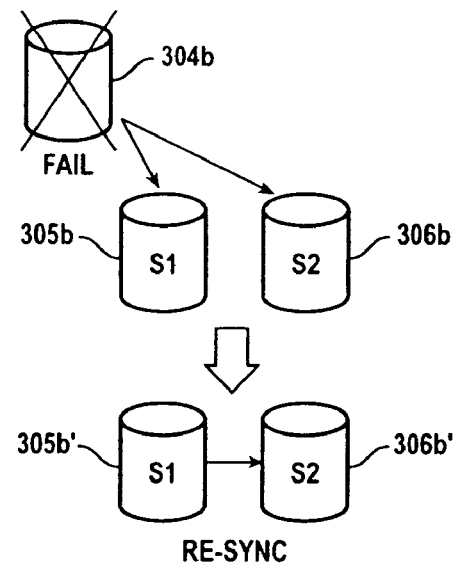

FIG. 3B, however, diagrammatically illustrates the scenario that can occur if the local storage facility. Again, a local storage facility 304B is communicatively coupled in parallel to remote storage facilities 305B and 306B. If a failure of the local storage facility 304B is detected, the remote storage facilities 305B', 306B' will, as illustrated in the bottom half of FIG. 3B, synchronize the data images they hold to that of the remote storage facility having the latest updates. Assuming the two remote storage facility 305B is the most up to data, a synchronization process according to the present invention will take place to synchronize one of the data images of the remote storage facilities to that of the other. As will be seen there are two options for synchronization. A roll forward procedure in which the latest updates are sent to the remote storage facilities that need them, or a rollback procedure in which the latest updates are discarded. Either procedure works to equalize the data images held by the surviving remote storage facilities.

Figure 3C:
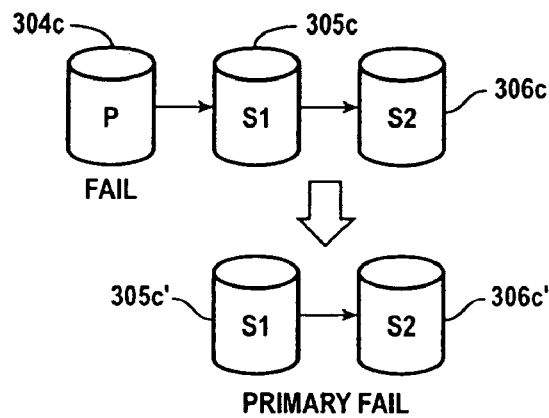
Figure 3D:
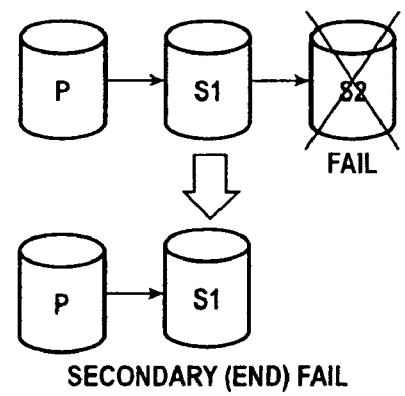
Figure 3E:
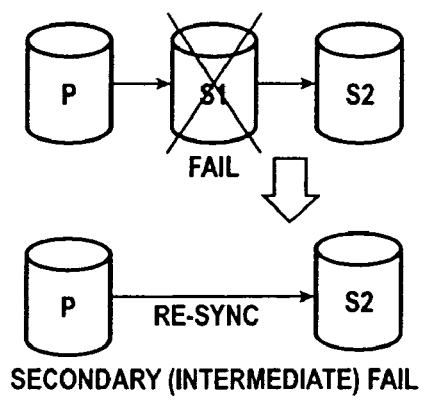

FIGS. 3C, 3D and 3E illustrate the situations that can occur when a daisy-chain network connection is used to connect the local and remote storage facilities 304C, 305C and 306C, respectively. FIG. 3C illustrates failure of the local storage facility 304C, leaving the remote storage facility 305C for the synchronization of remote storage 306C. If, on the other hand, the remote storage at the end of the daisy-chain, remote storage facility 306C, fails, as illustrated in FIG. 3D, there is no need for synchronization. If, as illustrated in FIG. 3E, an intermediate remote storage facility fails, the surviving remote storage facilities are synchronized by the local storage facility, assuming the network connection is not affected.

Figure 4A:
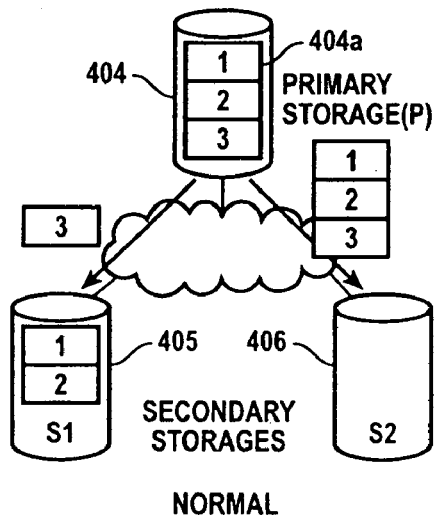
FIGS. 4A-4E are diagrammatically illustrate different synchronization scenarios to synchronize the data images of the surviving storage facilities should one (e.g., the local storage facility) fail.

FIGS. 4A-4E illustrate, broadly, operation of the invention to synchronize the data images of remote storage facilities, in the face of a failure of the local storage facility, employing the historical information held by each of the storage facilities respecting data messages received. FIG. 4A illustrates a normal situation, showing a local storage facility 404 with three data messages (1, 2, 3) held in a remote copy queue 404a. Two of the data messages (1, 2) have been sent and received by the remote storage facility 405, and the third data message, 3, is in the process of being sent to the remote storage facility 405. However, none of the data messages 1, 2, 3, have been received by the remote storage facility 406, but are in the process of being ready to be sent or are being sent.

Figure 4B:
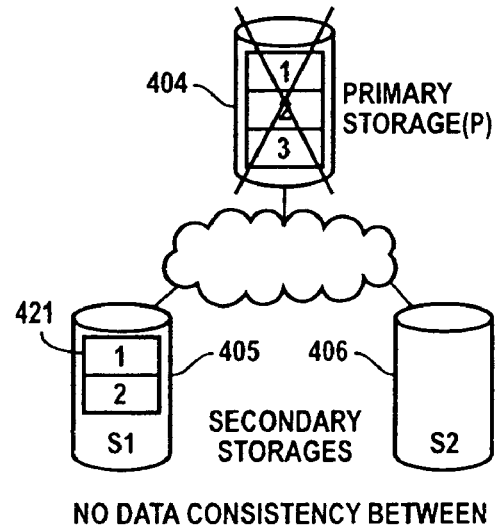
Figure 4C:
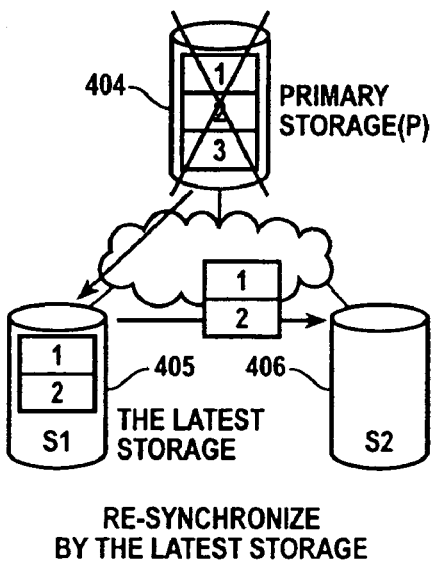

Given this situation, FIG. 4B illustrates the scenario resulting from failure of the local storage 404—before the data message 3 has been received by the remote storage facility 405, and before any of the data messages 1, 2, 3 have been received by the remote storage facility 406. This scenario has the data images between the remote storage facilities 405, 406 differing by the two recently received data messages 1, 2, held in the roll back queue 421 of the remote storage facility 405. According to the present invention, one technique of synchronization of the data images held by the two storage facilities 405, 406 will, therefore, require that the remote storage facility 406 also have the data messages 1, 2, for updating the data image maintained by remote storage facility 406. Thus, as FIG. 4C shows, after determining that the differences in the data images is the two data messages 1, 2, held by the remote storage facility 405, those data messages will be transmitted to the remote storage facility 406 for "roll forward" synchronization. Alternatively, the rollback procedure of synchronization will have the remote storage facility discarding the data messages 1 and 2. The rollback procedure of synchronization is shown in FIG. 3E and discussed below.

Figure 4D:
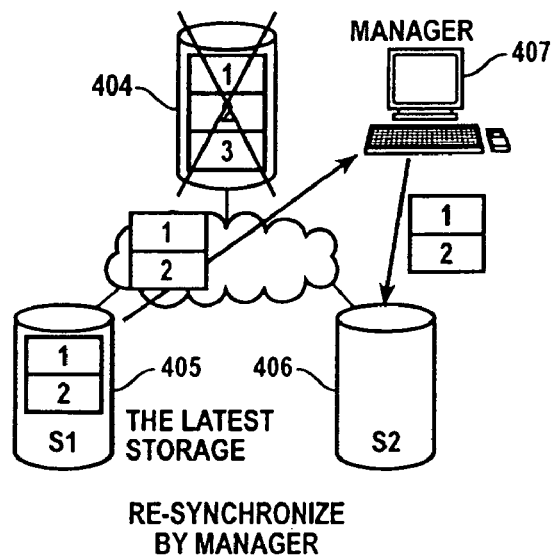

FIG. 4D illustrates roll forward synchronization by a manager 407, software which may execute anywhere on the system. Thus, the manager may be separate from the rest of the system, yet have access to the system and the remote storage facilities 405, 406, or form a part of one of the storage facilities. However implemented, the manager 407 operates to participate in a colloquy between the remote storage facilities 405, 406 that is initiated upon detection of failure of the primary storage facility 404. From that colloquy the manager 407 will learn which remote storage facility has updates from the primary storage facility 404 before its demise that were not received by other storage facilities. In the example shown in FIG. 4D, therefore, the manager 407 will be informed that the remote storage facility will have received data messages 1 and 2, while the remote storage facility 406 did not, and that the data messages 1 and 2 are contained in the rollback queue of the storage facility 405. The manager will then access the remote storage facility 405 to transfer the messages 1, 2 to the remote storage facility 406, thereby synchronizing the data image of remote storage facility 406 to that of remote storage facility 405. Alternatively, the manager 407 may decide to discard the data messages from the rollback queue of the remote storage facility 405. Since the data message never made it to the intermediate queue, the data corresponding to the messages was never written to change the data image. Thus, this latter synchronization operation by rollback, if taken, synchronizes the data image of the remote storage facility 405 to that of remote storage facility 406.

Figure 4E:
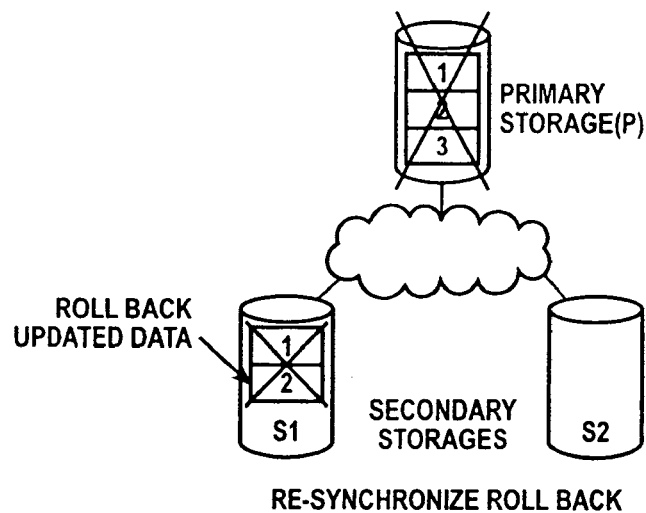

FIG. 4E illustrates another version of the roll back synchronization procedure. As before, when the primary storage 404 fails, holding data messages 1, 2, 3 to be sent for updating the data images of remote storage facilities, only the remote storage facility 405 has been updated, and only to the extent of data messages 1 and 2. The remote storage facility 406 has not been updated at all with the data messages 1, 2, 3. Accordingly, the data images held by the storage facilities 405, 406 differ by data messages 1 and 2 when the local storage facility 404 fails. Thus, according to the roll back procedure implemented by the present invention, rather than forwarding the data messages 1, 2, from the remote storage facility 405 to the remote storage facility 406, to synchronize the data images held by each, the data messages are discarded by the remote storage facility 405.

Figure 5:
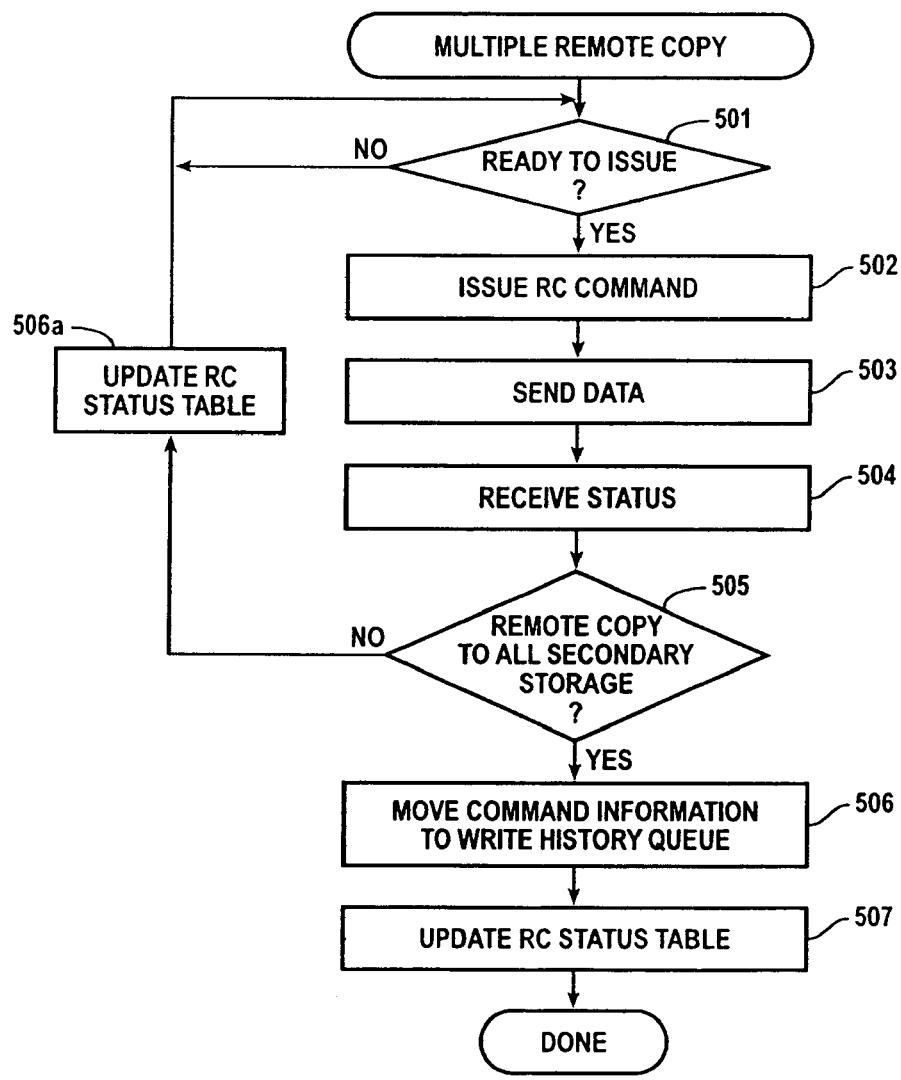
FIG. 5 shows the major steps employed by the remote copy procedure to copy data changes made to the data image of local storage by sending data messages to the remote storage facilities.

Illustrated in FIG. 5 are the principal steps taken by the local storage facility 104 (FIG. 1) for a remote copy operation to copy data updates received from the host 101 (FIG. 1) are copied to the remote storage facilities. As indicated above, an I/O write request from the host processor 101 changing the data image maintained by the local storage facility 104 will necessitate a similar change of the mirroring data images maintained by the remote storage facilities. The I/O write request will result in formation of a corresponding command entry that includes an assigned a sequence number and a pointer to the data of the request. The command entry is placed in the working queue 110 until all data is received and an acknowledgment returned to the host 101. Then, the command entry will be moved to the roll back queue 111. When the roll back queue becomes full, or a flush command is received (described below) the command entry will then be moved to the intermediate queue 112. While in the intermediate queue, the corresponding data of the request will be written to the storage media 142.

Periodically, the remote copy process executing on the CPU 133 will review the content of the intermediate queue to determine if it contains command entries for which data messages will need to be formed for received I/O requests to copy the update data to each of the remote storage facilities 105, 106. Referring, then to FIG. 5, the local storage facility 104 will, in step 501, check to see if each remote storage can receive data messages. It does this by reference to the RC status table 114, which tells the local storage what messages have and have not yet acknowledged as having been received by, each remote storage, as well as the sizes of the various queues maintained by the remote storage. From this, the local storage can determine whether or not the particular remote storage has room to receive another data message and associated data. If not, step 501 is exited. Also, the remote storages themselves can return an indication of inability to receive further data messages, for example using either of such SCSI defined "BUSY(0x08)" or "Queue Full (0x28)" status signals.

If the remote storage in question has sufficient room to receive a data message, the local storage will issue a remote copy (RC) command to the remote storage facility (e.g. remote storage facility 105) in the form of a data message followed, in step 503, by the data. The local storage facility 104 then awaits a status report as to whether or not the data message was received (step 504), and when received the local storage facility 104, in step 505, will check to see if all remote storage facilities have been updated with the data message. If not, the procedure moves to step 506a to update the RC status table 114 to show that the subject remote storage facility received the data message, and returns to step 501 for the next remote storage facility to receive the data message.

If, however, step 505 finds that all remote storage facilities have received the data message, the data message (command entry) will be moved to the write history queue in step 506, and the RC status table 114 updated in step 507, and the procedure concluded for that data message.

Figure 6:
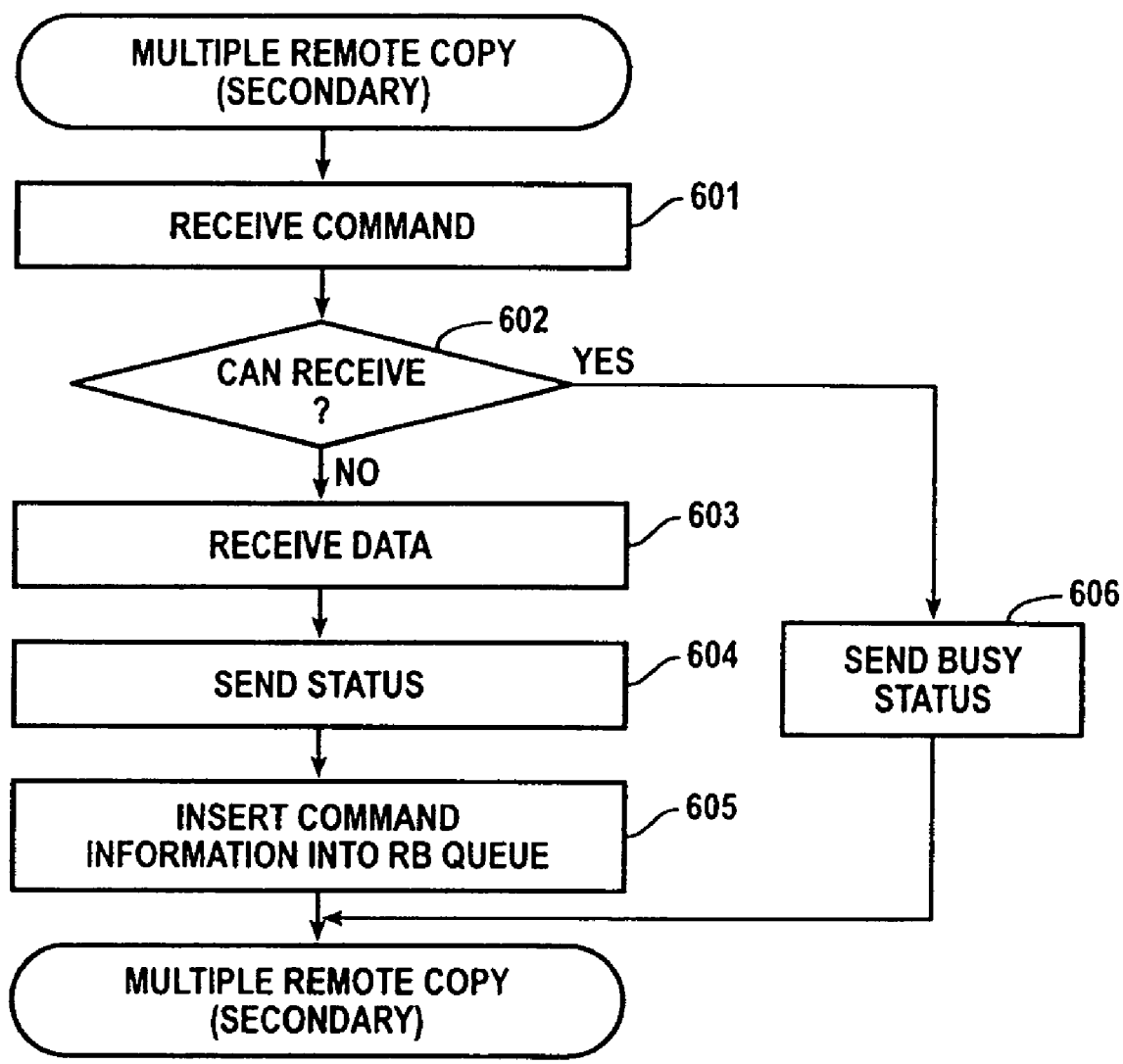
FIG. 6 shows the major steps taken by a remote storage facility in response to receipt of a data message from the local storage facility.

FIG. 6 broadly illustrates the steps taken at a remote storage facility to receive the data message of the remote copy process. At step 601 the remote storage facility will receive a data message and, in step 602, will check the availability status of the queue resource for the data message, i.e., is there room available. In addition, the determination of step 602 depends upon the alignment of the queues (i.e., roll back, intermediate, and write history queues) relative to the content of the queues of other remote storage facilities, as will be described below. If the decision of step 602 is that it cannot receive the data at this time, step 602 will be exited in favor of step 606 in which the remote storage facility will return a "Busy" status message to the local storage facility and exit the receive procedure. The local storage will realize that it will have to try again later.

If, on the other hand, step 602 decides that the data can be received, step 602 is followed by step 603 in which the data is received and, step 604, in which the remote storage facility returns the status of the data transmission. At step 605, the data message is moved from the working queue, used to receive the message and data, to the roll back queue.

Figure 7:
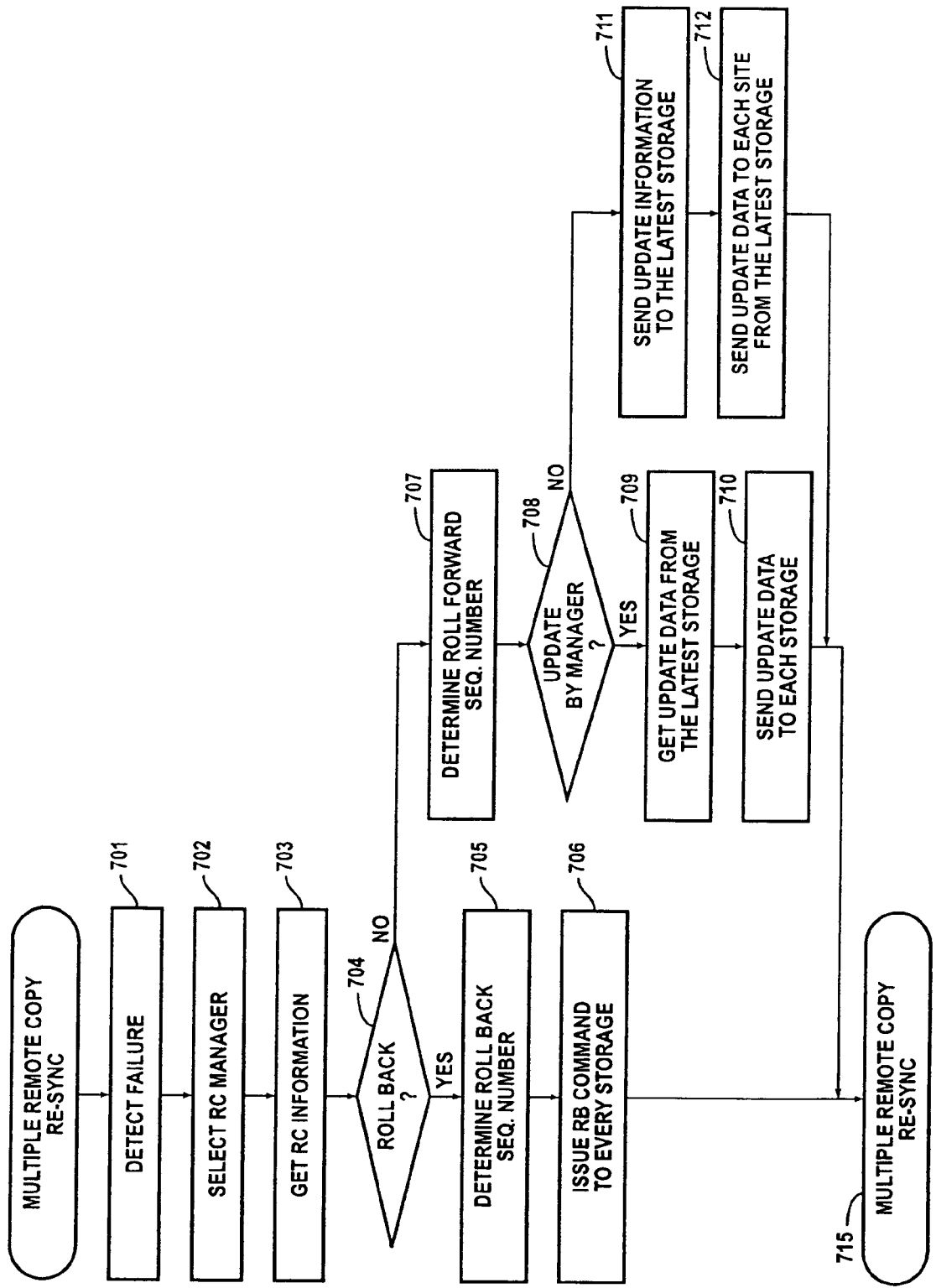
FIG. 7 shows the major steps taken by the remote storage facilities when a failure of the local storage facility is detected.

FIG. 7 illustrates the steps taken for a synchronization process when a failure of the local storage facility is detected (or a failure of a remote storage facility if it is an intermediate site in a daisy chain configuration such as shown in FIG. 3E). In step 701 a failure is detected. Failure detection may be accomplished in a number of ways. For example, the storage facilities may broadcast to one another heartbeat messages that, when absent, indicate a failure; or, a storage facility may be capable of detecting a failure of itself, but still be able to broadcast that failure to the other elements of the system; or any other conventional failure detection technique. When a failure is detected, the remaining storage facilities, such as storage facilities 105, 106 in the configuration shown in FIG. 2, will communicate with one another to negotiate who among themselves will be the new remote copy manager. The selected storage facility will control remote copy operations to ensure that the data images of all remaining storage facilities are synchronized to the same state. Alternatively, a remote copy manager may be predefined by a system administrator. However selected, the remote copy manager becomes the local storage facility and, in step 703, gathers information concerning the content and structures of the various queues maintained by the remaining storage facilities. This information includes the range (number of entries) of the roll back and write history queues, including how many entries contain data messages. For example, referring to FIG. 2, in the event the local storage facility 104 fails, and the remote storage facility 105 is elected or otherwise determined to be the remote copy manager in step 702, the remote storage 106 will report that its roll back queue 131 contained data messages 8, 9, 10, and 11, and that its write history queue 133 contains data messages 3, 4, 5, and 6. The content of the intermediate queue of the remote storage facility 106 will shortly be added to the write history queue because preferably when a failure is detected the remote storage facility will empty the intermediate queues, thereby writing the data to the storage media maintained.

Having now obtained the information about the remote copy environment of the remaining storage facilities, after a failure of one of them, the elected remote copy manager determines whether to perform a roll back operation or a roll forward operation. Typically, this will be predetermined by an administrator or user of the remote copy environment, setting a flag as to how best to synchronize the storage facilities in the face of a failure. If step 704 determines that a roll back procedure is to be used, step 705 follows with the remote copy manager determining the data message held by all storage facilities having the highest sequence number. For example, referring to FIG. 2, the data message having the sequence number 9 meets that criteria. Accordingly, in step 706, the elected remote copy manager will issue a roll back command to all other storage facilities that, when received, will cause them to discard data messages having sequence numbers greater than 9. Thus, again referring to FIG. 2, the remote storage facility 106, when it receives the roll back command, will discard the messages having sequence numbers 10 and 11. The procedure then concludes at step 715.

If, on the other hand, the decision made at step 704 is to roll forward, step 707 is executed to determine a roll forward sequence number. This is accomplished by the remote copy procedure comparing the contents of the various roll back and write history queues to determine that storage facility having the latest data messages, if any. Thus, in FIG. 2, if the elected remote copy manager is storage facility 105, it will see that the remote storage facility 106 contains data messages having the sequence numbers 10 and 11, while it does not. Accordingly, it will initiate a copy procedure from the remote storage facility 106 of the data messages 10 and 11 so that the data images maintained by each will be synchronized. Thus, in step 708, if the elected remote copy manager determines that it is the most up to date storage facility, it will leave step 708 in favor os step 709 in which the selected RC manager obtains the update data from the storage facility having the most recently received data messages. This could be the selected RC manager itself, or it could be one of the other storage facilities. In any event, when the selected RC manager receives the update data, it will move to step 710 to selectively transmit the update data, or portions thereof, to the other storage facility needing update to synchronize the data images of all remote storage facilities. The procedure will then conclude with step 715.

Conversely, if the decision made in step 708 is that the synchronization will be performed by the storage facility having the most recent data message updates, and that storage facility is not the selected RC manager, (or another storage facility has been predetermined to be the synchronizing facility), the RC manager will send the update information, comprising which storage facilities need updating, to that storage facility having the most recent updates. Then, in step 712, update data, in the form of data messages, will be sent to all storage facilities needing synchronization of their data images, and the procedure concludes with step 715.

If rollback procedures are to be employed (such as illustrated in FIG. 4E and discussed above), the RB queues should of the remote storage facilities 105, 106 (FIG. 1) will preferably be aligned. An alignment procedure is performed by the local storage facility 104, using the remote copy process executing on the CPU 133 and the remote copy status table 114 (providing information as to the content of the various queues maintained by the remote storage facilities 105, 106). For example, there may be occasions when a remote storage is unable to receive remote copy data messages from the local storage facility, while the other remote storage facilities do. In this situation care must be taken to ensure, for synchronization purposes, that there is at least a one data message overlap between the data messages in the queues of one remote storage facility when compared to any other remote storage facility to ensure that synchronization can always take place when needed.

Figure 8:
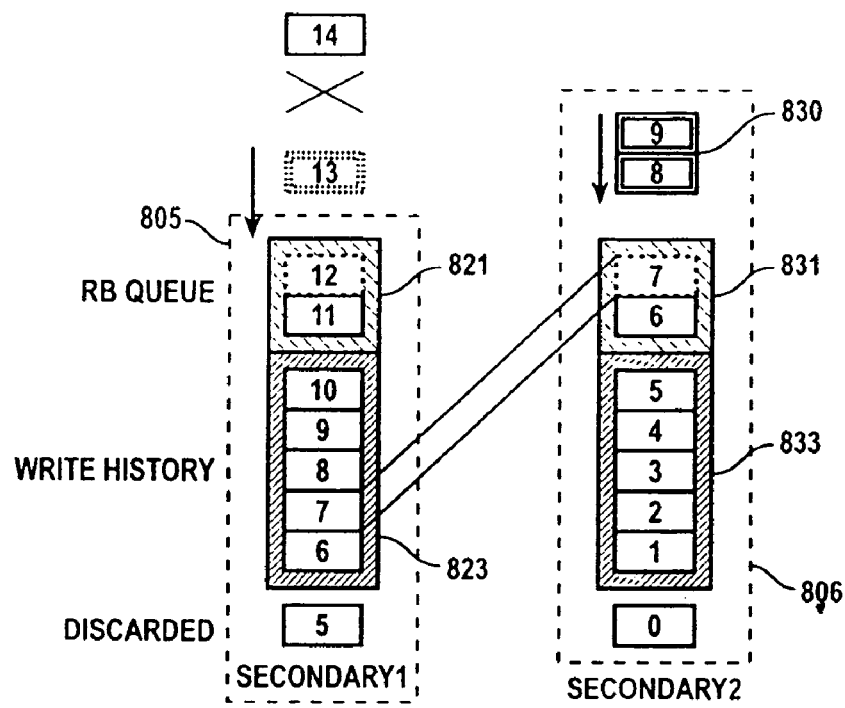
FIGS. 8 and 9 are diagrammatic illustrations of alignment and flush procedures initiated by the local storage facility in order to maintain data overlaps in the information queues of the respective remote storage facilities.

FIGS. 8. and 9. illustrate an alignment procedure for all queues (RB queue, write history); with FIG. 8 diagrammatically illustrating the overlap, showing the rollback queues 821/831 of remote storage facilities 805/806 as being two entries deep, and the write history queues 823/833 of each being five entries deep. (The working and intermediate queues are not shown in order to not unduly complicate the description.) In FIG. 8, the remote storage 805 has received, and moved to the write history queue 823, data messages 6, 7, . . . , 10, while data messages 11 and 12 reside in the roll back queue 821. The remote storage facility 805 is shown as being in the process of receiving a data message 13, and the local storage facility (not shown in FIG. 8) is preparing to send a data message 14. Receipt and acceptance of the data message 13 will result in the data message being moved to the rollback queue 821. This, in turn, will cause the data message 11 to be moved to the write history queue to make room. In turn, the write history queue will drop the data message entry 6. The remote storage facility 805 is now ready to receive transmission of the data message with sequence number 14.

At the same time, the remote storage 806 has data messages 1-5 in its write history queue 833, data messages 6 and 7 in its rollback queue 831, and is in the process of receiving and accepting data messages 8 and 9.

Given the scenario of FIG. 8, should the remote storage facility 805 receive and accept data message 14, the end of the write history queue, data message 7, will be dropped. Should there be a failure of, for example, the local storage facility before the data messages 8 and 9 are received and accepted by the remote storage facility 806, there will be no way to synchronize the two remote storages using the rollback technique, because the information for data message 7 is lost to the remote storage 805. Thus, the local storage facility (not shown in FIG. 8), with the knowledge provided by the remote copy status table 114 (FIG. 2) as to which data messages are received and in which queues of the remote storage facilities 805, 806, will maintain alignment of the two by withholding transmission of the data message 14 until the remote storage facility 806 receives and accepts at least data message 8.

Figure 9:
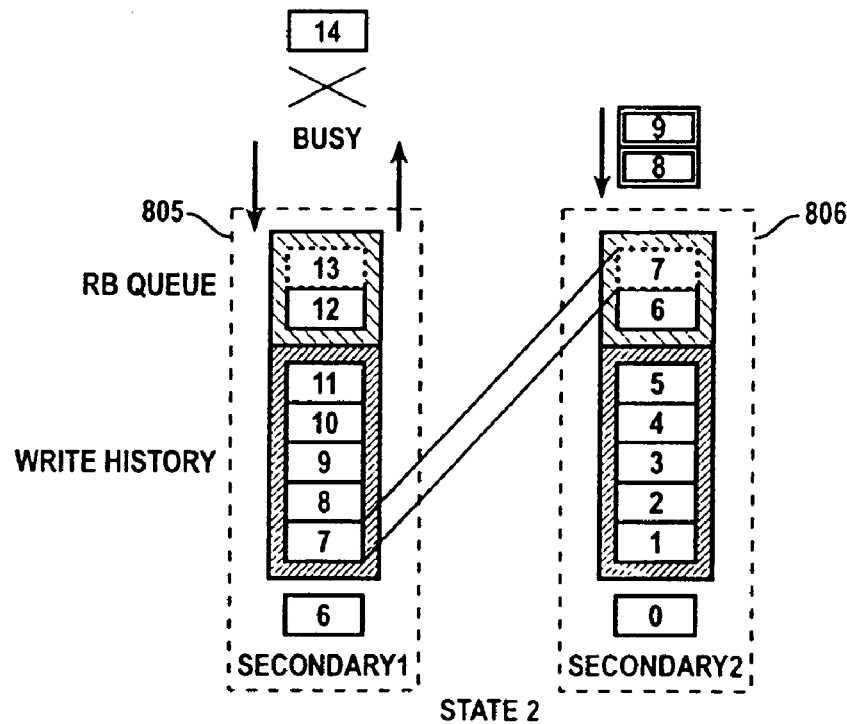

FIG. 9 illustrates an alignment procedure employed by the local storage facility 104, using a flush command, which is issued periodically. In FIG. 9, the local storage facility issues a flush command, identifying data message 6. This will cause the remote storages 805, 806 to keep retain data messages received after data message 6, i.e., data message 7 and all subsequent data messages. However, the remote storage 805 still cannot receive data message 14, and will return a busy status.

What is claimed is:

1. A processing system, comprising:
   a local host computer;
   a local storage system including a primary volume, a first communication port, and a second communication port, the local storage system receiving write requests from the local host computer via the first communication port, data associated with the write requests being written to the primary volume;
   a first remote storage system having a mirrored volume, a first communication port, and a second communication port, the mirrored volume having a data image that mirrors the data image of the primary volume; and
   a second remote storage system having a mirrored volume, a first communication port, and a second communication port, the mirrored volume having a data image that mirrors the data image of the primary volume,
   wherein commands are sent from the second communication port of the local storage system and received at the second communication port of the first remote storage system and at the second communication port of the second remote storage system,
   wherein the commands cause a copy of data corresponding to the write request to be created on the mirrored volumes respectively of the first remote storage system and the second remote storage system,
   wherein each of the first remote storage system and the second remote storage system has information indicating a status of the copy of the write data,
   wherein when the local storage system fails, one of the first or the second remote storage systems communicates to the other of the first or second remote storage systems the information indicating a status of the copy of the write data in order to identify differences between data images maintained by each of the mirrored volumes.

2. The processing system of claim 1 wherein the commands include a remote copy command.

3. The processing system of claim 1 further comprising a communication channel between the local host computer and at least one of the remote host computers.

4. A processing system, comprising:
   a local site having a local host computer and a local storage system, the local storage system including a primary volume and receiving write data from the local host computer to the primary volume;
   at least two remote sites, each having a remote host computer and a remote storage system, each remote storage system including a mirrored volume of the primary volume for storing a copy of the write data, and
   a communication channel between the local storage system and at least one of the remote storage systems,
   wherein the local storage system is operable to send one or more commands to each of the remote storage systems to cause a copy of the write data to be stored on their respective mirrored volumes,
   wherein each of the remote storage systems has information indicating a status of the copy of the write data,
   wherein one of the remote storage systems communicates to the other of the remote storage systems the information indicating a status of the copy of the write data in order to identify difference between data images maintained respectively by each of the mirrored volumes when the local storage system fails.

5. The processing system of claim 4 wherein the one or more commands include a remote copy command.

6. The processing system of claim 4 further comprising a communication channel between the local host computer and at least one of the remote host computers.

7. A method for mirroring data that is stored in local storage system to a first remote storage system and a second remote storage system comprising:

receiving in the local storage system a write request from a host computer in data communication therewith;

sending at least one command from the local storage system to the first remote storage system;

sending the at least one command from the local storage system to the second remote storage system;

in response to receiving the at least one command, the first and second remote storage systems each creating a copy of data associated with the at least one command to be made and stored thereat, the data being associated with the write request;

when the local storage system fails, sending status information from the first or second remote storage system, designated as the sender, to the other of the remote storage systems, designated as the receiver, the status information indicative of the state of the copy of the data associated with the at least one command being created in the sender; and identifying in the receiver differences between data images maintained in the sender and in the receiver based at least on the status information received from the sender.

8. The method of claim 7 wherein the at least one command is a remote copy command.

* * * * *